United States Patent [19]

Vinogradov et al.

[11] 4,160,180
[45] Jul. 3, 1979

[54] ROTOR LAMINATION SUPPORT FOR VERTICAL HYDRO-GENERATOR

[76] Inventors: Evgeny N. Vinogradov, ulitsa Belgradskaya, 6, korpus 2, kv. 45; Jury A. Ivanov, ulitsa Syzranskaya, 18, kv. 56; Nikolai A. Filatov, Moskovsky prospekt, 175, kv. 60; Viktor S. Fomichev, linia Bulvarnaya, 35, kv. 49; Samuil A. Prutkovsky, linia Lensoveta, 73, korpus 2, kv. 67, all of Leningrad, U.S.S.R.

[21] Appl. No.: 923,992

[22] Filed: Jul. 12, 1978

[51] Int. Cl.² .............................................. H02K 1/22
[52] U.S. Cl. .................................. 310/157; 310/217; 310/265
[58] Field of Search ................. 310/42, 157, 216–218, 310/261, 264, 265

[56] References Cited

U.S. PATENT DOCUMENTS

| 3,112,420 | 11/1963 | Meyer | 310/265 X |
| 3,470,404 | 9/1969 | Agerman et al. | 310/157 X |
| 3,529,193 | 9/1970 | Lindstedt | 310/157 X |

FOREIGN PATENT DOCUMENTS 2002887 7/1971 Fed. Rep. of Germany ........... 310/157

Primary Examiner—Mark O. Budd
Attorney, Agent, or Firm—Steinberg & Blake

[57] ABSTRACT

A rotor of a large size vertical hydro-generator, comprising a shaft and a frame with wedge strips attached thereto and provided in their lower portions with a dismountable support means for supporting a laminated rim with poles. The support means includes oppositely directed wedges disposed in a horizontal transverse slot formed on the outside of the lower portion of each wedge strip and partially projecting beyond this slot in the direction of the rim.

4 Claims, 4 Drawing Figures

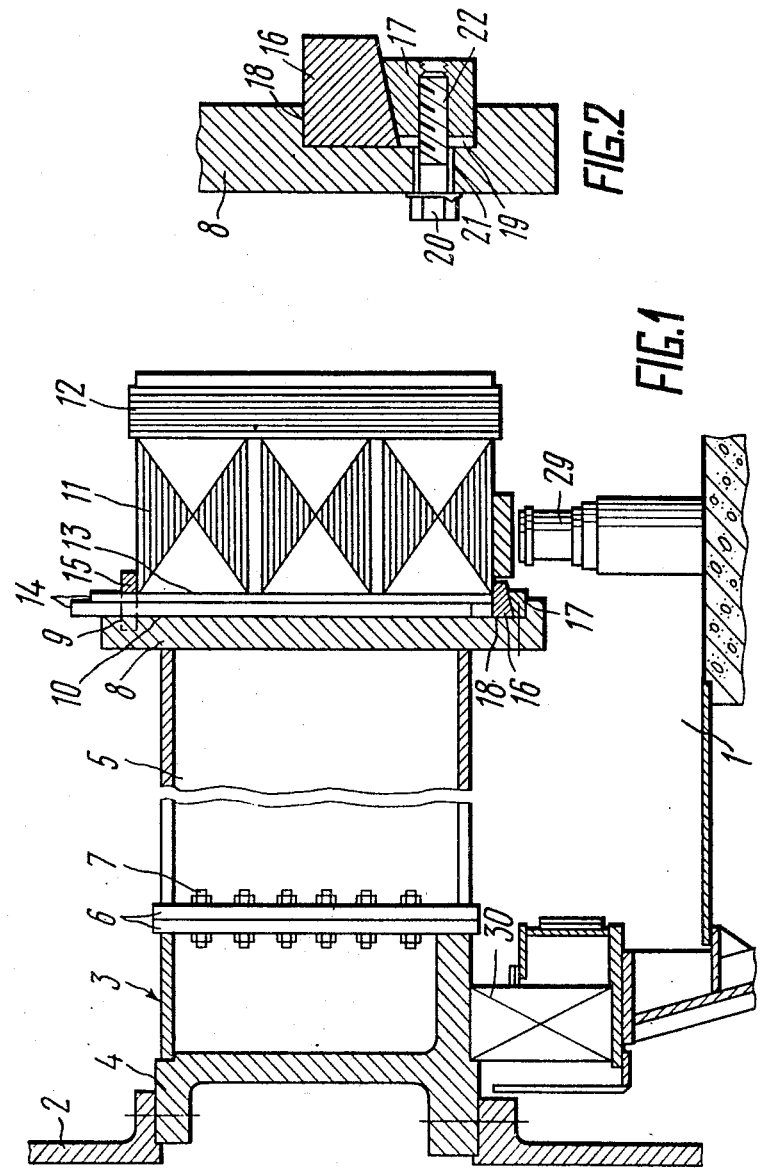

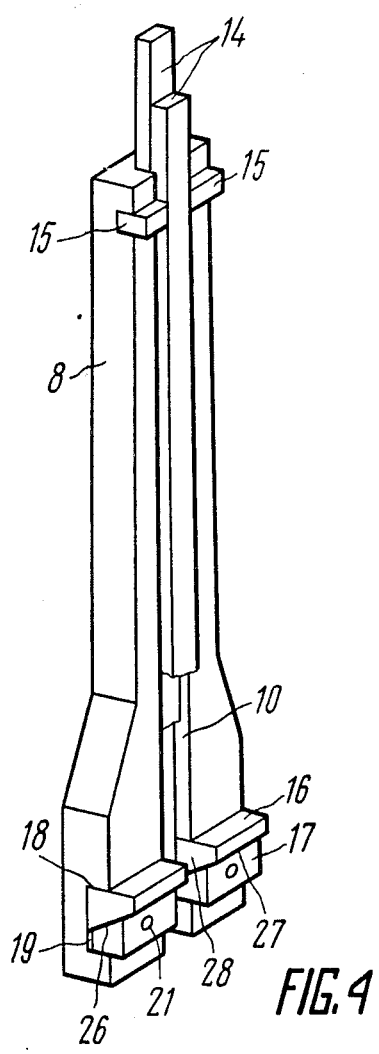

ROTOR LAMINATION SUPPORT FOR VERTICAL HYDRO-GENERATOR

FIELD OF THE INVENTION

The present invention relates to a vertical synchronous electric machine, and more particularly to rotors of vertical hydro-generators.

The present invention can most advantageously be used for large size vertical hydro-generators having a laminated pole-carrying rim detachable from the rotor frame.

BACKGROUND OF THE INVENTION

Some prior art constructions of rotors for vertical hydro-generators permit detachment of the rim with pole-pieces from the frame of the rotor as the hydro-generator is assembled or disassembled in the well of the hydraulic plant. It arises from the tendency to place less stringent requirements on the load-carrying capacity of the assembly equipment. This disconnection feature is provided by a removable support means for supporting the pole-carrying rim after the rotor of the hydro-generator has been completely assembled. In one such rotor of a vertical hydro-generator /cf.Inventor's Certificate of the U.S.S.R. No. 429490/, comprising a shaft and a frame with wedge strips attached thereto, the strips have provided in their lower portion a horizontal transverse slot wherein a support means is disposed for supporting a rim with poles. The support means is formed by a member with a pair of longitudinal projections essentially of a channel section with one of its legs shortened, and interlocked with the lower portion of the wedge strip as a result of the upper shortened projection of the member engaging said slot provided on the inside of the wedge strip. In this case the end of the wedge strip is enclosed, from the bottom, by the lower elongated projection extending slightly beyond the outside surface of the strip to provide a support for the rotor rim.

One disadvantage of this construction consists in the fact that the bending stresses borne by the elongated support projection due to the mass of the pole-carrying rim may be significant, since the distance between the point of application of forces exerted by the mass of the rim and the point of attachment of the support means to the wedge strip is comparatively large. This is liable to result in deformation of the supporting projection and consequently in the axial displacement of the motor rim.

Another drawback of the construction is a difficulty encountered in fabrication of the support means: in order to provide satisfactory assembling of the device, it is necessary that the mating parts be shaped to conform to each other, in particular, at least the horizontal slot formed in the wedge strip should be shaped exactly to match the upper projection of the support means inserted into the slot. Moreover, in order that the horizontal slot be cut on the inside of all the wedge strips, the frame of the rotor has to be turned through 180 degrees, in the vertical plane with respect to its working position, so as to permit ready access for the cutting tool to the portion of the frame to be machined. Another disadvantageous feature is an increased amount of the material expended for providing larger dimensions of the lower portion of the wedge strip on the inside thereof, which is required for mounting and securing the support means at the point.

It also will be noted that when disassembling the rotor, the support means for supporting the pole-carrying rim sometimes has to be detached from the wedge strip of the frame, approaching from the side of the hydro-generator brake plate, which may be inconvenient.

SUMMARY OF THE INVENTION

It is an object of the present invention to provide a rotor of a vertical hydro-generator, equipped with a simple and reliable dismountable means for supporting the pole-carrying rim, the support means being mounted in the lower portion of each wedge strip of the rotor frame.

Another object of the invention is to provide a rotor for a vertical hydro-generator, with a dismountable support means designed so as to reduce the stress imposed thereon due to the mass of the pole-carrying rim.

Still another object of the present invention is to provide a rotor of a vertical hydro-generator with a dismountable support means permitting an easy and convenient assembly and disassembly of this rotor.

A further object of the invention is to improve operational reliability of the vertical hydro-electric generator.

With these and other objects in view there is proposed a rotor of a vertical hydro-generator, comprising a shaft and a frame with wedge strips attached thereto having provided in their lower portion a horizontal transverse slot with a support means disposed therein for supporting a pole-carrying rim, wherein according to the invention the support means is formed by oppositely directed wedges arranged within said slot provided in outer side of the lower portion of each wedge strip, the wedges partially projecting beyond the slot and extending towards the rim.

The advantage of the proposed rotor of a vertical hydro-generator is that in the support means for the pole-carrying rim, the shape and dimensions of the oppositely directed wedges forming part of the supporting structure need not exactly match those of the horizontal transverse slot wherein they are disposed. In addition, such construction of the support means tends to minimize the hazard of deformation of the load-sensing member, which would bring about the displacement of the rim with respect to the frame.

It is preferable that the oppositely directed wedges be disposed in the horizontal transverse slot one above another and arranged with their slopes lying in the direction from the frame periphery to the rotor shaft, at least one of these wedges being bolted to the wedge strip.

As a result of this arrangement of the oppositely directed wedges, an additional force is caused to be applied to the pole-carrying rim, as the wedges are driven into the horizontal slot, which ensures a tighter fit of the rim against the frame to counteract the tendency of the wedges to self-loosen under the influence of dynamic loads during operation of the hydro-generator.

In one embodiment of the rotor of a vertical hydro-generator, on that side of each of the oppositely directed wedges facing the bottom of the horizontal transverse slot, there are provided vertical flutes combined to form a single vertical slot after said wedges have been assembled in the horizontal transverse slot.

The vertical flutes provided in the oppositely directed wedges of the support means will permit arrangement of stay taper keys along the entire length of the wedge strip and will enable the machining operation, such as using a mandrel, designed to eliminate the surface roughness tending to occur, when assembling the laminated rim, on the surface of the grooves formed in the rim for receiving the taper keys, to be performed throughout the length of the grooves, after the rim has been mounted on the support means.

In another embodiment of the rotor of a vertical hydro-generator, the oppositely directed wedges are formed by a pair of sets of wedges arranged in a spaced-apart relation within the horizontal transverse slot.

The embodiment of the oppositely directed wedges of the support means in the form of two sets of wedges ensures an ease of manufacture as well as separate adjustment of the wedge sets in the slot relative to the stay taper keys of the wedge strip.

BRIEF DESCRIPTION OF THE DRAWINGS

These and other objects and advantages of the present invention will be apparent from the following detailed description of its preferred embodiments with reference to the accompanying drawings in which:

FIG. 1 shows, in diagrammatic form, a radial cross section through a portion of the rotor disposed in the rotor area of the hydro-generator enclosure, according to the invention;

FIG. 2 is an enlarged view of the lower portion of the wedge strip attached to the rotor frame, with a support means for supporting the rim of the rotor as illustrated in FIG. 1, a radial cross section;

FIG. 4 is a perspective view of another embodiment of the support means mounted on the wedge strip of the rotor frame.

Figure 3:
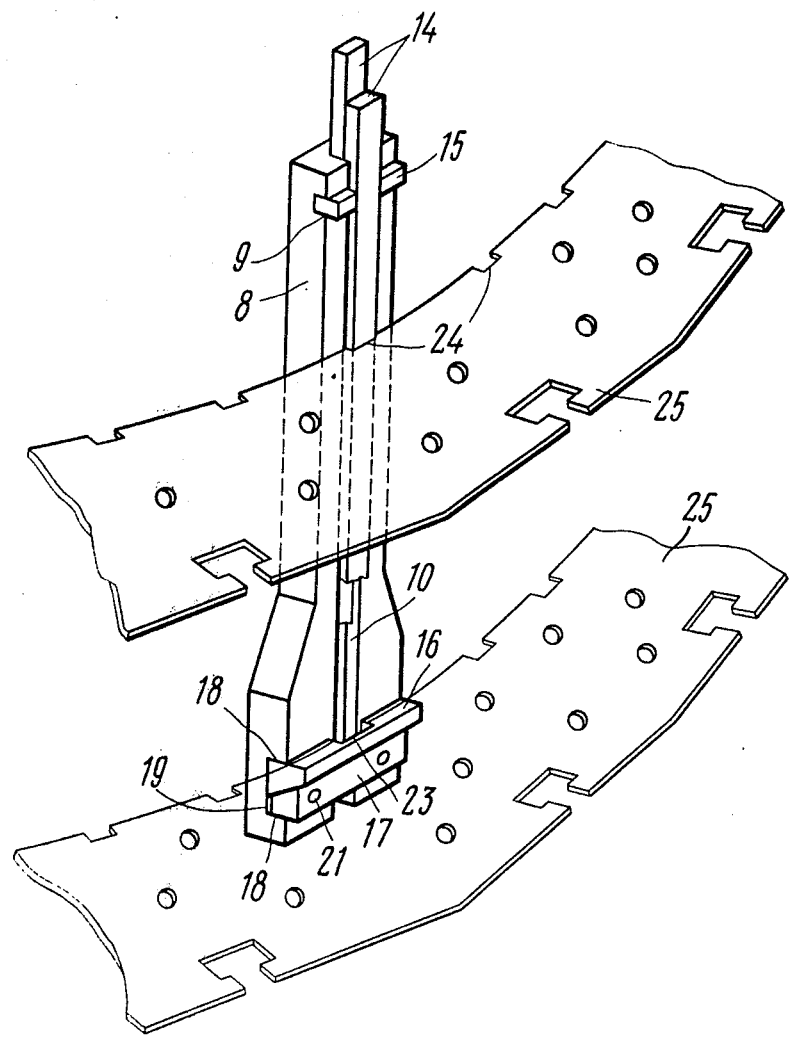
FIG. 3 is a perspective view of the wedge strip attached to the rotor frame, with a support means mounted thereon and one punching of the rotor core.

It will be understood that all the accompanying drawings are represented in a schematic form and are merely illustrative of specific embodiments of the present invention without any restrictions imposed on the dimensions and the like.

DETAILED DESCRIPTION OF THE INVENTION

Referring now to FIG. 1, the rotor of a vertical hydro-generator according to the present invention, disposed in a rotor area 1 of the generator enclosure comprises a shaft 2 and a frame 3 including a central portion in the form of a hub 4 fitted onto the shaft 2 and a plurality of radial spokes, one only of which is shown in the drawing at 5, which spoke is secured to the hub 4 by butt plates 6 with coupling studs 7. Welding to the outside portion of the spoke 5 is a wedge strip 8 having a horizontal transverse groove 9 cut in the top portion thereof and a vertical longitudinal groove 10 extending along the entire length of the strip.

Facing the vertical groove 10, in a laminated rim 11 carrying poles 12, there is provided a similar groove 13 which combines with the groove 10 to form a vertical keyway for receiving stay taper keys 14 inserted therein with a tight fit. These keys together with a fastening strap 15 inserted into the horizontal groove 9 provide for the laminated rim 11 with the poles 12 to be secured to the wedge strip 8 and hence to the frame 3 of the rotor, at the same time preventing the rim 11 from being displaced with respect to the frame 3 both in the radial and in the tangential direction during operation of the generator.

To prevent displacement of the laminated rim 11 with the poles 12 downward, a support means is provided on the lower portion of the wedge strip 8, including oppositely directed wedges placed one on top of another, such as an upper wedge 16 and a lower wedge 17. The oppositely directed wedges 16 and 17 are driven into a straight horizontal slot 18 formed in the lower portion of the wedge strip 8 on the outer side thereof and transversely thereto, these wedges (as shown in FIG. 2) being arranged in the slot 18 so that their slopes are directed from the periphery of the frame 3 to the shaft 2 of the rotor. In this arrangement the vertical plane at one end of the upper wedge 16 bears against the bottom of the slot 18, while the other end of the wedge 16 projects beyond the slot towards the rim 11, the projecting portion of the wedge 16 serving as a support for the laminated rim 11 with the poles 12. The lower wedge 17 is positioned in the slot 18 so that a gap exists between that side of the wedge facing the bottom of the slot 18 and this bottom. The lower wedge 17 is secured to the wedge strip 8 by means of field bolts, one only of which is shown in the drawing at 20, the bolt being inserted into a hole 21 in this strip and screwed into a through threaded hole 22 formed in the wedge.

In the embodiment of the present invention shown in FIG. 3 those sides of the oppositely-directed wedges 16 and 17 facing the bottom of the horizontal slot 18 in the wedge strip 8 have provided therein vertical flutes 23. When the wedges 16 and 17 are assembled in the slot 18, they form a single vertical slot with its cross section shaped to match a cut-out 24 made in a punching 25 of the laminated rim 11 and forming part of the vertical groove 13 facing the vertical groove 10 in the wedge strip 8. The vertical slot so produced together with the vertical groove 10 provides, in turn, a keyway to receive the taper keys 14 in the lower portion of the wedge strip 8.

In the embodiment of FIG. 4, the oppositely directed wedge 16 and 17 are arranged in the form of two sets 26 and 27 of such wedges mounted in the slot 18 with a gap 28 formed therebetween, which together with the vertical groove 10 likewise defines a keyway for receiving the taper keys 14 in the bottom portion of the wedge strip 8.

The assembly of the proposed rotor of a vertical hydro-generator will now be described.

After the laminated rim 11 with the poles 12 (FIG. 1) has been set on a braking gear 29 of the hydraulic plant, the frame 3 with the shaft 2 is placed inside the rim 11 and rests upon a step bearing 30. In this case the vertical grooves 10 in the wedge strip 8 on each spoke of the frame 3 are aligned with the corresponding vertical grooves 13 in the rim 11, and the lower edge of the rim is positioned, by means of the jacks (not shown) of the braking gear 29, slightly above the plane of the top (according to the drawing) side face of the horizontal slot 18 in the wedge strip 8. The lower wedge 17 of the support means is then driven into the slot 18, as shown in FIG. 2 (but not as deep as the bottom of the slot), the upper wedge 16 is placed on top of the lower wedge 17, and the wedging operation is performed. The oppositely directed wedges 16 and 17 are driven in until the end surface and the upper horizontal surface of the upper wedge 16 is brought into contact with the bottom and the top (according to the drawing) side face of the slot 18, respectively, and until the required tightness of fitting the wedges in this slot is obtained. Finally, the lower wedge 17 is locked in position by the bolts 20. When assembled, both the wedge 16 and the wedge 17 slightly project from the slot 18, as aforementioned.

When the oppositely directed wedges 16 and 17 (FIG. 1) are in place in the slot 18 provided in the wedge strip 8, the laminated rim 11 with the poles 12 is lowered by the previously mentioned jacks and set upon the support means, in particular, upon the projecting part of the upper wedge 16. Subsequently the stay taper keys 14 are inserted from the top into the keyway formed by properly aligned vertical grooves 10 and 13 provided in the wedge strip 8 and in the laminated rim 11, respectively, and these keys are driven in place, while simultaneously centering the rim 11 with respect to the frame 3. The resultant position of the rim 11 is locked by the fastening strap 15 inserted into the horizontal groove 9 cut in the upper portion of the wedge strip 8.

For certain purposes such as dismantling of the hydraulic turbine generally mounted below the hydro-generator, or for service and repair functions performed with components of the hydro-generator, including the frame 3 or the laminated rim 11, it may be necessary to detach the frame 3 with the shaft 2 from the rim 11. The disassembly of the rotor will now be described.

After the hydro-generator has been stopped, the rim 11 of the rotor is set on the braking gear 29 which bears, in this case, the complete mass of the rotor. The rim 11 is then heated, in the normal fashion, up to a temperature on the order of 40° to 50°C. to facilitate disassembling of the wedge joints connecting the frame 3 with the rim 11. When the rim 11 has been properly warmed up, the fastening strap 15 is removed from the horizontal groove 9 in the wedge strip 8 on each spoke of the frame 3, and the stay taper keys 14 are taken out of the keyways defined by the vertical grooves 13 and 10 in the rim 11 and the strip 8, respectively. The rim 11 thus detached from the frame 3 is subsequently raised by the aforementioned jacks of the braking gear 29, thereby relieving the support means of the wedge strip 8 of the stress exerted by the mass of the rim 11 with the poles 12. The support means is now ready for disassembling. To do this, bolts, including the bolt 20, securing the lower wedge 17 to the wedge strip 8 are first withdrawn, and the lower wedge 17 is slightly pushed out of the slot 18 using a special tool inserted into the gap 19 (FIG. 2), in order to loosen the fit, and both of the oppositely directed wedges 16 and 17 are removed from the slot. On disassembling the support means, the frame 3 (FIG. 1) with the shaft 2 is removed from the inner space of the rim 11 which is left resting upon the braking gear 29 in the area 1 of the hydro-generator.

The assembly and disassembly work carried out on the proposed rotor of a vertical hydro-generator according to the present invention, with the oppositely directed wedges 16 and 17 of the support means, as shown in the embodiments of FIG. 3 and FIG. 4, is essentially similar to that previously described, except that for the embodiment of FIG. 4, first one set of these wedges, such as the set 26, is driven into the slot 18 in the wedge strip 8 or removed therefrom, and then the other set 27, which may be convenient for some specific types of vertical hydro-electric generators. The oppositely directed wedges of the support means of the proposed rotor of a vertical hydro-generator are fabricated from normal construction steel or, in particular cases, from special steel. In the support means of the above described rotor employed in a vertical hydro-generator of about 200,000 kW, the oppositely directed wedges have the following dimensions: length 172 mm. width 60 mm, height 38 mm, for the depth of the slot wherein they are disposed equal to 40 mm; and the slope of the mating surfaces of the wedges is chosen in the range from 1:5 to 1:10, which practically eliminates the risk of self-unkeying and prevents the wedges from being pushed out of the slot when the hydro-generator is in operation. The support means is capable of withstanding a load of as much as 1000 kg/cm$^2$.

In the proposed rotor of a vertical hydro-generator, the construction of the support means provides an ease of manufacture, it is convenient to assemble and disassemble and reliable in operation. It facilitates the assembly and disassembly work on vertical hydro-generators, particularly of the large-size type, and saves the time required for installation or repair of a generator or a turbine incorporated in the vertical hydraulic plant.

It will be understood that the present invention is not restricted to the preferred embodiments herein described and illustrated, and other modifications and embodiments of the proposed rotor of a vertical hydro-generator are possible without departing from the spirit and scope of the same as disclosed in the following claims.

What is claimed is:

1. A rotor of a vertical hydro-generator, comprising:
   a shaft;
   a frame having a hub connected with said shaft and a plurality of radial spokes attached to said hub, said frame further including a plurality of wedge strips, each said radial spoke having at least one said wedge strip secured thereto;
   a rim with poles, connected to said wedge strips, each said wedge strip having on the outside of its lower portion a horizontal transverse slot and a support means supporting said rim with poles and including oppositely directed wedges disposed in said horizontal transverse slot and partially projecting beyond this slot towards said rim.

2. A rotor of a vertical hydro-generator in accordance with claim 1, in which said oppositely directed wedges of said support means are disposed in said horizontal transverse slot one above another and arranged so that their slopes are directed from the periphery of said frame to said shaft, at least one of said oppositely directed wedges being bolted to said wedge strip.

3. A rotor of a vertical hydro-generator, in accordance with claim 2, in which each of said oppositely directed wedges has provided on the side facing the bottom of said horizontal slot, vertical flutes forming together a single vertical slot when said oppositely directed wedges are completely assembled in said horizontal transverse slot.

4. A rotor of a vertical hydro-generator in accordance with claim 2, in which said oppositely directed wedges are arranged in two sets of wedges disposed in said horizontal transverse slot so that a gap is formed between said sets.

* * * * *